United States Patent Office 3,709,807
Patented Jan. 9, 1973

3,709,807
METHODS OF SEPARATING BY-PRODUCTS SULFURIC ACID FROM MIXTURES RESULTING FROM PHOTO-SULFOXIDATION REACTION OF PARAFFINS
Rinnosuke Susuki, Tokyo, and Sadao Toyoda and Kuniyoshi Takenouchi, Funabashi, Japan, assignors to Lion Fat & Oil Co., Ltd., Tokyo, Japan
No Drawing. Filed Mar. 23, 1970, Ser. No. 22,001
Claims priority, application Japan, Mar. 28, 1969, 44/23,662; Mar. 29, 1969, 44/23,965
Int. Cl. B01j 1/10
U.S. Cl. 204—162 R                           14 Claims

ABSTRACT OF THE DISCLOSURE

Methods of separating the by-product sulfuric acid from the reaction mixture resulting from photo-sulfoxidation of paraffins in which the concentration of the sulfuric acid is from 30 to 95% by weight, which comprise the step of neutralizing said reaction mixture with caustic alkali or contact the reaction mixture with undiluted sulfuric acid, thereby settling the by-product sulfuric acid within the reaction mixture.

BACKGROUND OF THE INVENTION

The present invention relates to methods of separating the by-product sulfuric acid from the reaction mixture obtained by photo-sulfoxidation of paraffins, and, more particularly, to a method of separating the by-product sulfuric acid from said reaction mixture without concentrating the latter by heating.

Paraffin sulfonic acids which are popular as surface active agents have been generally prepared by photo-sulfoxidation of paraffins. In effecting said photo-sulfoxidation of paraffins, a considerable quantity of water is introduced into the reaction zone for the purpose of controlling the occurrence of side reactions at the time of effecting the desired reaction, and the quantity of water added for this purpose is usually regulated so as to make the concentration of the by-product sulfuric acid in the resultant reaction mixture less than 20% by weight. The reaction mixture resulting from said sulfoxidation is then subjected to water-extraction, whereby separation of a heavy layer containing paraffin sulfonic acids, the intended product, is effected. The thus separated heavy layer, however, contains the by-product sulfuric acid in significant quantity. To give a typical composition of said heavy layer, it consists of paraffin sulfonic acids in the range of 20 to 30% by weight, the by-product sulfuric acid in the range of 7 to 10% by weight, water in the range of 30 to 40% by weight and unconverted paraffins in the range of 30 to 40% by weight. Such being the case, the conventional method of separating the by-product sulfuric acid from the heavy layer comprises the steps that: the heavy layer is heated at a temperature in the range of 60° to 180° C. to concentrate it and expel the excess water therefrom; after thus raising the concentration of sulfuric acid contained in the heavy layer up to 60 to 80% by weight, the heavy layer is allowed to settle, thereby causing the by-product sulfuric acid to separate therefrom.

The conventional method as above, however, has the shortcoming that the heating process required for effecting concentration of the heavy layer in this method results in coloring of the same. With a view to overcoming such shortcoming, there has also been proposed a method of separating the by-product sulfuric acid without concentrating the heavy layer by heating. In this method the concentration of sulfuric acid within the reaction mixture resulting from the photo-sulfoxidation reaction is controlled so as to be in the range of 60 to 95% by weight for which amount makes it possible to effect separation of the sulfuric acid, by regulating in advance the quantity of water added to the reaction zone at the time of photo-sulfoxidation according to this method, separation of the by-product sulfuric acid can be effected by merely allowing the reaction mixture to settle at a temperature of 30° to 100° C. However, the reaction mixture from which sulfuric acid has thus been removed still retains residual sulfuric acid in the amount of about 8 to 12% by weight of paraffin sulfonic acids, and, consequently, when a further separation of sulfuric acid is required, it is necessary to effect the settling of the reaction mixture for more than 20 hours.

SUMMARY OF THE INVENTION

The object of the present invention is to provide a method of separating the by-product sulfuric acid, efficiently and in a short period of time, from the reaction mixture obtained by the photo-sulfoxidation reaction of paraffins without coloring said reaction mixture.

One embodiment of the present invention consists in the method comprising the steps of: controlling the quantity of water existing in the reaction zone during the photo-sulfoxidation of paraffins so that the concentration of by-product sulfuric acid within the reaction mixture discharged from said reaction zone is in the range of 50 to 95%—preferably 70 to 80% by weight, removing sulfur dioxide dissolved in the reaction mixture; adding thereafter caustic alkali selected from the group consisting of caustic soda and caustic potash to the thus processed reaction mixture, thereby neutralizing substantially all of the paraffin sulfonic acids and the by-product sulfuric acid contained in said reaction mixture at a temperature in the range of 20° to 50° C.—preferably 25° to 45° C.; and separating the alkali sulfate from the thus neutralized reaction mixture by settling said mixture at a temperature in the range of 20° to 50° C.—preferably 25° to 45° C. It is to be noted that the concentration of by-product sulfuric acid refers to the amount of sulfuric acid based on the total content of water plus sulfuric acid in the reaction mixture.

Another embodiment of the present invention consists in the method comprising the steps of: controlling the quantity of water existing in the reaction zone during the photo-sulfoxidation of paraffins so that the concentration of by-product sulfuric acid within the reaction mixture discharged from said reaction zone is in the range of 30 to 95%—preferably 70 to 80% by weight; contacting the reaction mixture with sulfuric acid having a concentration of 60 to 100% by weight and equivalent the amount of said sulfuric acid being to one twentieth to twice (by weight) as much as said reaction mixture, at a temperature in the range of 30° to 100° C.; and separating the sulfuric acid layer containing by-product sulfuric acid from the thus processed reaction mixture by settling said mixture thereafter. It is preferred to contact the reaction with sulfuric acid having a concentration of 70 to 80% by weight and in an amount equivalent to one-tenth to one-fifth (by weight) of the reaction mixture.

The contact of the reaction mixture with sulfuric acid may be effecturated either by of introducing the reaction mixture into the sulfuric acid layer in droplets or by closely admixing the reaction mixture with the sulfuric acid.

As is evident from the foregoing, the concentration of the by-product sulfuric acid in the effluent from the photo-sulfoxidation reaction zone to be subjected to treatment by the method according to the present invention is higher than it is in the effluent from the conventional photo-sulfoxidation reaction zone. This fact means that the photo-sulfoxidation reaction of paraffins is effected in the presence of a comparatively small quantity of water. Accordingly, the reaction mixture to be subjected to treatment by the method according to the present invention usually contains a comparatively large quantity of by-products and is also colored to some extent. But, according to analyses conducted by the inventors, the content of the by-products is not exclusive—for instance, as for polysulfonic acids, it is less than 20% by weight of the intended sulfonic acids—and scarcely impedes the practical use of the resultant paraffin sulfonic acids. As for the matter of coloring, on the other hand, the neutralization process under according to the present invention is capable of producing the desired product which is in effect less colored than that in the prior art because as the reaction mixture can be maintained at a relatively low temperature in the range of 20° to 50° C. by means of reducing the time required from the beginning of the sulfoxidation reaction until the beginning of neutralization. Moreover, according to the sulfuric acid contact process under according to the present invention, because sulfuric acid is brought into contact with the reaction mixture, the colored substance contained in the reaction mixture is extracted to some extent, and, therefore, a decoloring effect can also be expected from this sulfuric acid contact process. Further, according to the sulfuric acid contact process according to the present invention, the separation of the by-product sulfuric acid from the reaction mixture can be performed by means of settling the reaction mixture for about 10 minutes to about 90 minutes at the utmost, subsequent to effecting the contact.

Details of apparatus, instruments, operational conditions, stock paraffins, etc. to be employed for the photo-sulfoxidation reaction of paraffins are well known to those skilled in this field and do not constitute, distinctive matters as far as the present invention is concerned, and, therefore, explanations thereof are omitted from the present specification. But, as to the stock paraffins, paraffins having substantially straight chains of $C_{10}$–$C_{26}$ are popular.

DESCRIPTION OF THE PREFERRED EMBODIMENTS

Example 1

Normal paraffin of $C_{14}$–$C_{18}$ and put in a photo-sulfoxidation reactor and subjected to photo-sulfoxidation reaction while water was added to said paraffins at the rate of 5 g./hr., whereby there was obtained a reaction mixture at the rate of 2000 g./hr. The concentration of hte by-product sulfuric acid within the reaction mixture thus obtained was 70% by weight. Subsequently, the reaction mixture was introduced at the rate of 2000 g./hr. into a degassing tower, where the sulfur dioxide dissolved in the reaction mixture was removed by blowing nitrogen gas into the tower. The reaction mixture thus treated was then transferred to a stirrer-equipped receptacle, where it was mixed with solid caustic soda more than the equivalent for neutralization and the reaction mixture was neutralized thereby at 35° C. while being stirred vigorously. Subsequent to neutralization, the reaction mixture was subjected to a centrifugal separation process at 35° C., whereby sodium sulfate was removed therefrom. When the content of sodium sulfate within the resultant reaction mixture was measured, after removing unconverted paraffins contained in the mixture by steam distillation, it was 5% by weight based on the sodium sulfonates. Further, the color tone of the resultant reaction mixture was 50 in terms of Klett color (measured by employing 5%, by weight, solution of sodium sulfonates).

Example 2

Normal paraffin of $C_{14}$–$C_{18}$ was put in a photo-sulfoxidation reactor and was subjected to photo-sulfoxidation reaction while water was added to said paraffin at the rate of 3 g./hr., whereby there was obtained a reaction mixture at the rate of 2000 g./hr. The concentration of the by-product sulfuric acid within the reaction mixture thus obtained was 80% by weight. Subsequently, the reaction mixture was introduced at the rate of 2000 g./hr. into a degassing tower, where the sulfur dioxide dissolved in the reaction mixture was removed by blowing nitrogen gas into the tower. The reaction mixture thus treated was then transferred to a neutralization receptacle, where it was neutralized by means of a caustic soda solution having 50% by weight concentration and fed into the receptacle at the rate of 3 g./hr. The temperature for neutralization in this case was 35° C. After neutralization, the sodium sulfate in the reaction mixture was deprived by filtering at 35° C., whereby there was obtained a filtrate. After removing unconverted paraffins from this filtrate by steam distillation, measurement was conducted of the content of sodium sulfate as well as the color tone of the resultant filtrate in the same way as in Example 1. As a result, it was found that the content of sodium sulfate was 7% by weight (as against sodium sulfonate), and the color tone was 53 in terms of Klet color (KL color).

Example 3.—Comparative example

The reaction mixture of this example was treated by the conventional photo-sulfoxidation method by the same conditions as those used in Examples 1 and 2 except for modifying the rate of water added to the reaction zone to 47 g./hr., and there was obtained a reaction mixture at the rate of 2000 g./hr. The concentration of the by-product sulfuric acid within this reaction mixture was 20% by weight. Subsequently, the reaction mixture was introduced at the rate of 2000 g./hr. into a separation tank, where it was subjected to water-extraction, thereby causing the heavy layer containing the by-product sulfuric acid, the intended sulfonic acids, etc. to be separated. 200 g. of the thus separated heavy layer was subjected to a concentration process for 45 minutes at a temperature of 93° C. under a pressure of 40–50 mm. Hg, and thereafter was allowed to settle for 30 minutes at the same temperature as above, thereby causing sulfuric acid to separate therefrom. The heavy layer thus deprived of sulfuric acid was then subjected to neutralization, and thereafter the unconverted paraffins were removed from the heavy layer by steam distillation. When the content of sodium sulfate within the thus processed heavy layer and the color tone thereof were measured according to the procedures described in Example 1, the content of sodium sulfate was 7% by weight (as against sodium sulfonate), and the color tone was 540 in terms of KL color.

Example 4

Normal alkane of $C_{14}$–$C_{18}$ was put in a photo-sulfoxidation reactor and was subjected to photo-sulfoxidation reaction while water was added to said paraffins at the rate of 5 g./hr., whereby a reaction mixture was obtained from the reactor at the rate of 2000 g./hr. The concentration of by-product sulfuric acid within the reaction mixture thus obtained was 70% by weight. Subsequently, this reaction mixture was introduced at the rate of 2000 g./hr. into the lower part of a column having a capacity of 200 ml. and containing 70% sulfuric acid, thereby making the reaction mixture pass into the sulfuric acid layer in the form of droplets. The reaction mixture taken out from the upper part of the foregoing sulfuric acid containing column was heated up to 80° C. and transferred to a separation tank having a capacity of 1200 ml., where it was let to settle for 30 minutes at the same temperature as above. As a result, the reaction mixture deprived of sulfuric acid was taken out from the upper part of the separation tank at the rate of 2000 g./hr. Measurement of the concentration of sulfuric acid within thus processed reaction mixture proved that the content of sulfuric acid was only 3.1% by weight as against sulfonic acid. Further, measurement of the color tone subsequent to removal of unconverted normal alkanes by neutralizing this reaction mixture revealed that it was 60 in terms of KL color (measured by employing 5% solution of sodium sulfonate).

Example 5—Comparative example

A reaction mixture resulting from photo-sulfoxidation conducted under the same conditions as in Example 4 was directly fed into the separation tank without introducing it into the sulfuric acid containing column, and was allowed to settle for 30 minutes at 80° C. When the concentration of sulfuric acid was measured thereafter with regard to the supernatant liquid phase within the separation tank, the content of sulfuric acid was 10.9% by weight as against sulfonic acid. And, as for the color tone, when measured in the same way as Example 4, it has proved to be 75 in terms of KL color. It is further noted that when the time of settling within the separation tank was prolonged up to 300 minutes, there was a slight decrease in the concentration of sulfuric acid to 8.4% by weight as against sulfonic acid, while, as for the color tone, there was observed no change thereof.

Example 6

Normal alkane of $C_{14}$–$C_{18}$ was put in a photo-sulfoxidation reactor and subjected to photo-sulfoxidation reaction while water was added to said alkanes at the rate of 3 g./hr., whereby a reaction mixture was obtained from the reactor at the rate of 2000 g./hr. The concentration of by-product sulfuric acid within the reaction mixture thus obtained was 80%. Subsequently, this reaction mixture was introduced at the rate of 2000 g./hr. into a stirrer-equipped mixer, whereby it was mixed with 80% sulfuric acid which was simultaneously introduced into said mixer at the rate of 400 g./hr. (that is, at the mixing rate of 100:20). The resultant mixture was then heated up to 80° C. and transferred to a separation tank with a capacity of 1200 ml., where it was allowed to settle for 30 minutes at the same temperature as above. After the settling, there was obtained a supernatant liquid phase from which sulfuric acid has been removed, from the upper part of the separation tank at the rate of 2000 g./hr. As for the sulfuric acid obtained from the lower part of the separation tank, a portion thereof was returned to the foregoing mixer at the rate of 400 g./hr. while the rest was pulled out from the reaction zone at the rate of 15 g./hr.

When the supernatant liquid phase resulting from the foregoing operation was measured on the content of sulfuric acid as well as the color tone thereof in the same way as in Example 4, the result was as shown in the following table. Meanwhile, when a series of photo-sulfoxidation operations were conducted in the same way as above but modifying the concentration of sulfuric acid to be mixed with the reaction mixture to 60%, 70% and 98% by weight, respectively, the results were as shown in the same table.

TABLE

| | Conditions for separation | | Concentration of sulfuric acid in resultant reaction mixture (as against sulfonic acid) (wt. percent) | Color tone (KL color) |
|---|---|---|---|---|
| | Time, min. | Temperature, °C. | | |
| Concentration of sulfuric acid to be mixed (wt. percent): | | | | |
| 98 | 30 | 80 | 4.4 | |
| 80 | 30 | 80 | 2.8 | 65 |
| 70 | 30 | 80 | 3.1 | |
| 60 | 30 | 80 | 7.0 | |
| Example 7 | 30 | 80 | 10.4 | 73 |
| | 300 | 80 | 8.0 | |
| | 24 | 80 | 4.0 | 70 |

Example 7

A reaction mixture resulting from photo-sulfoxidation conducted under the same conditions as in Example 6 was directly brought in the separation tank without mixing with sulfuric acid and was allowed to settle therein. The conditions for separation of sulfuric acid and the content of sulfuric acid in the resultant reaction mixture deprived of by-product sulfuric acid as well as the color tone thereof were as shown in the latter part of the foreoing table.

What is claimed is:

1. In a method for preparing organic sulphonic acid which comprises contacting paraffinic hydrocarbon with sulfur dioxide and oxygen in a photo-sulfoxidation reaction, followed by removal of the sulfur dioxide, sulfuric acid and unreacted paraffinic hydrocarbon from the reaction mixture, the improvement which comprises:

during the photo-sulfoxidation reaction, adding water to the photo-sulfoxidation reaction system in an amount sufficient to maintain, in the reaction mixture removed from the photo-sulfoxidation reaction system, a by-product sulfuric acid concentration in the range of from 50 to 95% by weight, wherein the by-product sulfuric acid concentration is based on the total amount of water plus sulfuric acid in said reaction mixture;

removing sulfur dioxide dissolved in said reaction mixture;

then adding caustic alkali to said reaction mixture at a temperature in the range of from 20° to 50° C., in an amount sufficient to neutralize substantially all of the paraffin sulfonic acid and sulfuric acid contained in said reaction mixture;

then separating the thus-formed alkali sulfate from said reaction mixture at a temperature in the range of from 20° to 50° C.;

and then removing unreacted paraffinic hydrocarbon from the said reaction mixture.

2. A method as defined in claim 1, wherein said caustic alkali is solid alkali selected from the group consisting of caustic soda and caustic potash.

3. A method as defined in claim 1, wherein said caustic alkali is a 50% by weight solution of an alkali selected from the group consisting of caustic soda and caustic potash.

4. A method as defined in claim 1, wherein the concentration of sulfuric acid within said reaction mixture removed from the photo-sulfoxidation reaction system is in the range of 70 to 80% by weight.

5. A method as defined in claim 1, wherein said neutralization is effected at a temperature in the range of 25° to 45° C.

6. A method as defined in claim 1, wherein said separation is effected at a temperature in the range of 25° to 45° C.

7. In a method for preparing organic sulphonic acid which comprises contacting paraffinic hydrocarbon with sulfur dioxide and oxygen in a photo-sulfoxidation reaction, followed by removal of the sulfur dioxide, sulfuric acid and unreacted paraffinic hydrocarbon from the reaction mixture, the improvement which comprises:

during the photo-sulfoxidation reaction, adding water to the photo-sulfoxidation reaction system in an amount sufficient to maintain, in the reaction mixture removed from the photo-sulfoxidation reaction system, a by-product sulfuric acid concentration in the range of from 30 to 95% by weight, wherein the by-product sulfuric acid concentration is based on the total amount of water plus sulfuric acid in said reaction mixture;

then contacting said reaction mixture with fresh liquid sulfuric acid having a concentration of from 60 to 100% by weight, at a temperature in the range of from 30° to 100° C., the amount of said fresh sulfuric acid being in the range of from 1/20 to 2 times the weight of said reaction mixture;

then separating the fresh liquid sulfuric acid, containing by-product sulfuric acid, from said reaction mixture at a temperature in the range of from 30° to 100° C.

8. A method as defined in claim 7, wherein the concentration of by-product sulfuric acid within said reaction mixture removed from the photo-sulfoxidation reaction system is in the range of 70 to 80% by weight.

9. A method as defined in claim 7, wherein the amount of fresh liquid sulfuric acid contacted with said reaction mixture is in the range of from $\frac{1}{10}$ to $\frac{1}{5}$ times the weight of said reaction mixture.

10. A method as defined in claim 7, wherein said reaction mixture is caused to pass into a layer of said fresh liquid sulfuric acid in droplets.

11. A method as defined in claim 7, wherein said reaction mixture is mixed with said fresh liquid sulfuric acid.

12. A method as defined in claim 7, wherein the concentration of fresh liquid sulfuric acid contacted with said reaction mixture is in the range of 70 to 80% by weight.

13. A method as defined in claim 7, wherein the contact between the said reaction mixture and the fresh liquid sulfuric acid is effected at a temperature in the range of 50° to 80° C.

14. A method as defined in claim 7, wherein said separation is effected at a temperature in the range of 50° to 80° C.

References Cited

UNITED STATES PATENTS

| | | | |
|---|---|---|---|
| 3,413,337 | 11/1968 | Bost | 204—162 R |
| 3,457,155 | 7/1969 | Rosinger | 204—162 HE |
| 3,372,188 | 3/1968 | Alston et al. | 204—162 R |
| 2,702,273 | 2/1955 | Kennedy | 204—162 R |

FOREIGN PATENTS 1,039,804  8/1966  Great Britain.

BENJAMIN R. PADGETT, Primary Examiner